US007392538B2

(12) United States Patent
Okamoto et al.

(10) Patent No.: US 7,392,538 B2
(45) Date of Patent: Jun. 24, 2008

(54) FIREWALL APPARATUS

(75) Inventors: Chikashi Okamoto, Yokohama (JP); Hiromichi Ito, Yokohama (JP); Shigeto Oeda, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 840 days.

(21) Appl. No.: 10/198,978

(22) Filed: Jul. 19, 2002

(65) Prior Publication Data
US 2003/0070095 A1   Apr. 10, 2003

(30) Foreign Application Priority Data
Oct. 4, 2001  (JP)  ............................. 2001-308155

(51) Int. Cl.
G06F 7/04 (2006.01)
G06F 15/16 (2006.01)
H04L 9/32 (2006.01)

(52) U.S. Cl. ............................. 726/11; 726/4; 726/14; 713/153; 713/154; 713/162; 709/227; 709/245

(58) Field of Classification Search ...................... None
See application file for complete search history.

(56) References Cited

U.S. PATENT DOCUMENTS

| 6,119,171 | A  | * | 9/2000  | Alkhatib ..................... 709/245 |
| 6,157,955 | A  | * | 12/2000 | Narad et al. ................. 709/228 |
| 6,430,623 | B1 | * | 8/2002  | Alkhatib ..................... 709/245 |
| 6,480,900 | B1 | * | 11/2002 | Habert ....................... 709/245 |
| 6,507,908 | B1 | * | 1/2003  | Caronni ...................... 713/153 |
| 6,523,022 | B1 | * | 2/2003  | Hobbs ......................... 707/3  |
| 6,598,167 | B2 | * | 7/2003  | Devine et al. ................. 726/8  |
| 6,606,708 | B1 | * | 8/2003  | Devine et al. ................. 726/8  |
| 6,658,565 | B1 | * | 12/2003 | Gupta et al. ................. 713/153 |
| 6,678,827 | B1 | * | 1/2004  | Rothermel et al. ............. 726/6  |
| 6,680,922 | B1 | * | 1/2004  | Jorgensen .................... 370/328 |

(Continued)

FOREIGN PATENT DOCUMENTS

JP         11-187061         7/1999

(Continued)

OTHER PUBLICATIONS

Warkhede, Priyank. Suri, Subhash. Varghese, George. "Fast Packet Classification for Two-Dimensional Conflict-Free Filters". INFOCOM 2001. Publication date: 2001. pp. 1434-1443. Found on the World Wide Web at: http://ieeexplore.ieee.org/iel5/7321/19795/00916639.pdf?tp=isnumber=19795&number=916639&punumber=7321.*

(Continued)

Primary Examiner—Christopher Revak
Assistant Examiner—Jeremiah Avery
(74) Attorney, Agent, or Firm—Townsend and Townsend and Crew LLP

(57) ABSTRACT

Communication using IPv6 is carried out, and conversion is given to a prefix of an IPv6 address in a firewall. A security channel for mutual authentication with an out-of-home apparatus or the like is carried out by the firewall, and only identification of an in-home apparatus is carried out on an in-home network by the firewall. A PC is connected to a PC in-home network different from the in-home network, and communication between the PC and the in-home apparatus is always carried out via the firewall.

5 Claims, 9 Drawing Sheets

U.S. PATENT DOCUMENTS

| | | | |
|---|---|---|---|
| 6,754,831 B2 * | 6/2004 | Brownell | 726/15 |
| 6,771,635 B1 * | 8/2004 | Vilander et al. | 370/349 |
| 7,006,526 B1 * | 2/2006 | Biederman | 370/466 |
| 2002/0016826 A1 * | 2/2002 | Johansson et al. | 709/207 |
| 2002/0042883 A1 * | 4/2002 | Roux et al. | 713/201 |

FOREIGN PATENT DOCUMENTS

| | | |
|---|---|---|
| JP | 2001-053779 A | 2/2001 |
| JP | 2001-060973 A | 3/2001 |

OTHER PUBLICATIONS

Nokia Networks. White Paper on "Introducing Mobile IPv6 in 2G and 3G Mobile Networks". Publication Date: 2001. Relevant pp. 3-14. Found on the World Wide Web at: http://nds2.ir.nokia.com/NOKIA_COM_1/About_Nokia/Press/White_Papers/pdf_files/whitepaper_mipv6_1s.pdf.*

* cited by examiner

FIG.10

IN-HOME APPARATUS DATABASE 215

| ITEM NUMBER | IN-HOME NETWORK IPv6 ADDRESS | ID INFORMATION OF OUT-OF-HOME APPARATUS | INFORMATION REQUIRED FOR SECURITY COMMUNICATION |
|---|---|---|---|
| 1 | fec0:0:0:3ff0::56 | 2001:200::49 | secret key: 0x2a96c8<br>public key: 0x3d115c<br>protocol: RSA |
| 2 | fec0:0:0:3ff0::57 | 133.104.0.7 | common key: 2ea946bb<br>protocol: DES |
| 3 | fec0:0:0:3ff0::58 | ::ff36:2951 | certificate: xxx<br>protocol: ECp |

FIREWALL APPARATUS

BACKGROUND OF THE INVENTION

The present invention relates to a device and a communication method by which an information apparatus connected to a network inside a firewall and another information apparatus connected to a network outside the firewall make communication with each other securely.

In recent years, the IP protocol which is a standard protocol of the Internet is practically a de facto standard protocol in communication among information apparatuses, and the IP protocol is also used domestically. Such an example is disclosed in JP-A-11-187061. In consideration of the starvation of numbers, the security, and so on, in a network inside a firewall and safe in terms of information security (hereinafter, referred to as "in-home network"), a local address is assigned to each of connected information apparatuses (hereinafter, referred to as "in-home apparatuses") so as to be identified. To make communication with an information apparatus (hereinafter, "out-of-home apparatus") connected to a network outside the firewall (hereinafter, referred to "out-of-home network"), the local address is converted to a global address in the firewall.

In addition, a security communication protocol typified by IPsec (IP Security) operates between terminals making communication with each other.

In addition, all the in-home information apparatuses are connected to the in-home network.

According to such a technique, the address of the in-home apparatus may change whenever communication is made. Thus, it is impossible to start communication from the out-of-home apparatus.

In addition, in order to perform communication securely, a security communication function is required to be mounted, and in order to keep the in-home network secure, all the in-home apparatuses that make communication with the out-of-home apparatus are required to have such a security communication function.

In addition, any PC is so sophisticated that it can operate various connection means or other apparatuses. Accordingly, even if unauthorized access from the outside is excluded by the firewall, there is a fear that the in-home apparatuses are damaged once the PC is infected with a virus.

In addition, when the Internet service provider is changed, the assigned address is changed. It is therefore necessary to reset the addresses of all the in-home apparatuses. Further, in order that each in-home apparatus knows the network to which the apparatus as a source of a received message belongs, it is necessary to mount a function of investigating the path history of the message.

SUMMARY OF THE INVENTION

An object of the present invention is to provide a mechanism by which secure communication can be made between an out-of-home apparatus and an in-home apparatus.

In order to solve the foregoing problems, according to the present invention, IPv6 is used as the IP protocol, and conversion of an IPv6 address is carried out in a firewall. The IPv6 address has 128-bit length, generally, the higher 64 bits of which are used as an identifier of a network and called a prefix. The lower 64 bits are used as an identifier of an apparatus in the network and called an interface ID. The prefix is generated on the basis of the network to which the apparatus is connected. By use of a stateless address automatic setting function, the interface ID is generated from the MAC address (Media Access Control address) of the in-home apparatus which is a target for communication. Conversion of the IPv6 address is applied only to the prefix. The prefix before the conversion is generated on the basis of the out-of-home network, while the prefix after the conversion is generated on the basis of the in-home network.

When the aforementioned address conversion system is used, any one of the in-home apparatuses can be specified individually from the out-of-home apparatus. It is therefore possible to start communication from the out-of-home apparatus. In addition, any communication between the out-of-home apparatus and the in-home apparatus is always made via the firewall. Accordingly, actions which may cause damage to the in-house apparatus are monitored by the firewall so that the damage can be prevented.

In addition, according to the present invention, a sophisticated security communication function such as mutual authentication with an out-of-home apparatus is mounted on the firewall, while in-home apparatuses are mounted with only a required minimum security communication function. Thus, even without mounting a sophisticated communication function on all the in-home apparatuses, communication with the out-of-home apparatus can be performed while the in-home network is kept secure.

In addition, according to the present invention, a PC is connected to a network different from the in-home network so that communication between the PC and the in-home apparatus is always performed via the firewall. Even if the PC is infected with a virus, there is no fear that the in-home apparatus is damaged easily.

In addition, even when the Internet service provider is changed, communication with the out-of-home apparatus can be made by a simple method of changing the address of the firewall and without any necessity to change the addresses of the in-home apparatuses.

In addition, by a simple method of mounting a function of extracting a prefix portion of a source address of a received message on each in-home apparatus, the in-home apparatus can easily judge whether the received message comes from an apparatus connected to the in-home network or not.

According to an embodiment of the present invention, it is possible to provide a mechanism in which communication between an out-of-home apparatus 1 and an in-home apparatus 3 can be performed securely, communication between a PC 4 and the in-home apparatus 3 can be performed securely, communication can be started from the out-of-home apparatus 1, and the security of an in-home network 6 can be kept even without mounting a security communication function on the in-home apparatus 3.

Other objects, features and advantages of the invention will become apparent from the following description of the embodiments of the invention taken in conjunction with the accompanying drawings.

BRIEF DESCRIPTION OF THE DRAWINGS

FIG. 10 is a diagram showing an example of an in-home apparatus database 215 according to the embodiment of the invention.

DESCRIPTION OF THE EMBODIMENT

An embodiment of the present invention will be described below.

Figure 1:
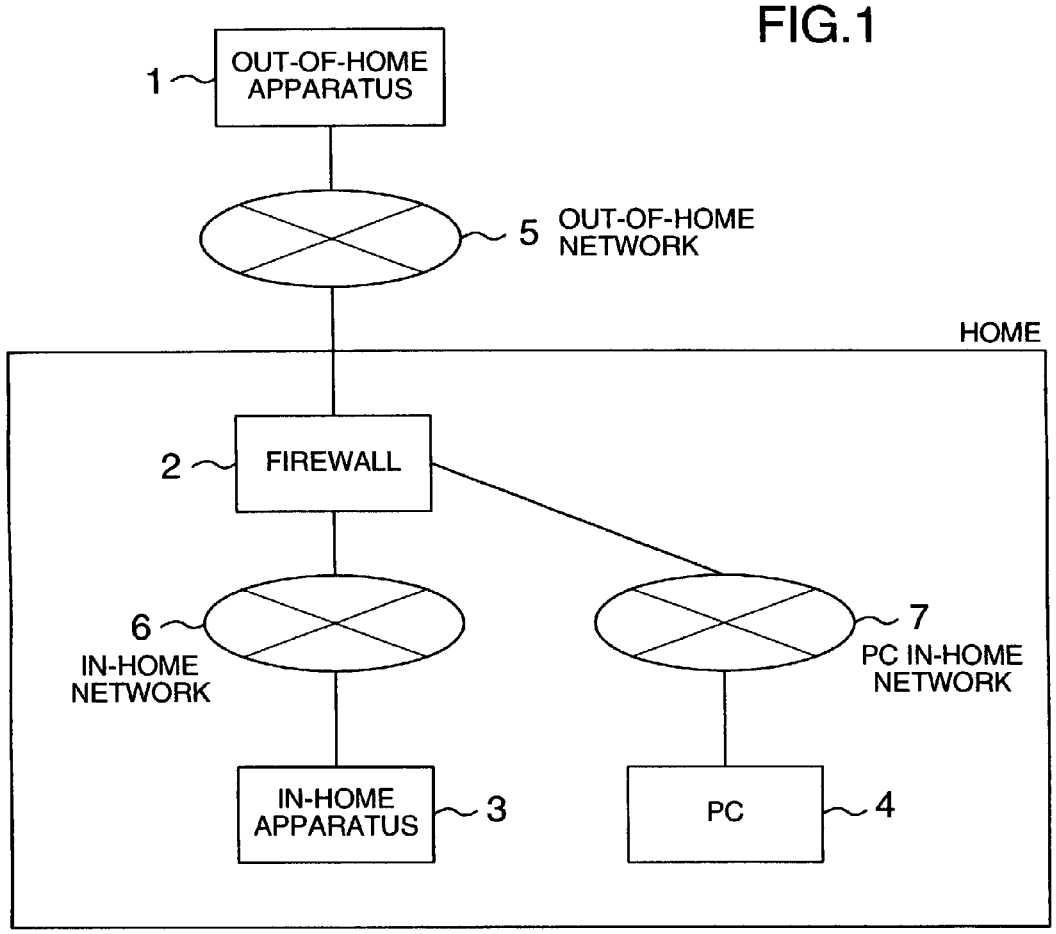
FIG. 1 is a diagram showing the schematic configuration of a communication system according an embodiment of the invention.

First, the schematic configuration of a communication system according to this embodiment will be described with reference to FIG. 1. In FIG. 1, reference numeral 1 represents an out-of-home apparatus. The out-of-home apparatus means an information apparatus connected to a network outside the firewall, and typically located outside the home. Examples of the out-of-home apparatus 1 include a server, a PC, a cellular phone, a PDA, etc. Numeral 2 represents a firewall. The firewall is a device for connecting the interior of the home with an external network. In the present invention, the firewall chiefly serves to monitor unauthorized communication and convert IPv6 addresses. Numeral 3 represents an in-home apparatus. The in-home apparatus means an information apparatus connected to a network inside the firewall 2. Examples of the in-home apparatus 3 include electrical household appliances or electronic equipment having communication facility, such as an air conditioner, a refrigerator, a microwave oven, a sensor device, a video tape recorder, a telephone set, etc. Numeral 4 represents a PC (personal computer). Numeral 5 represents an out-of-home network, which connects the out-of-home apparatus 1 with the firewall 2. Numeral 6 represents an in-home network, which connects the in-home apparatus 3 with the firewall 2. Numeral 7 represents a PC in-home network, which connects the PC 4 with the firewall 2.

Next, the configuration of an IPv6 address used for identifying an apparatus in the aforementioned communication system will be described with reference to FIG. 2.

Figure 2:
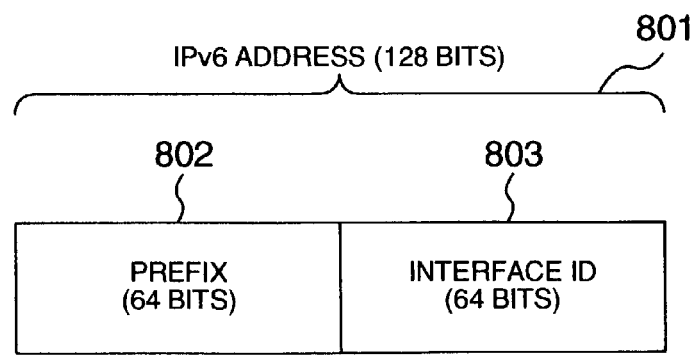
FIG. 2 is a diagram showing the schematic configuration of an IPv6 address according to the embodiment of the invention.

As shown in FIG. 2, an IPv6 address 801 is constituted by a prefix 802 of higher 64 bits and an interface ID 803 of lower 64 bits. The prefix 802 is used as an identifier of a network to which an apparatus designated by the IPv6 address is connected, and the interface ID 803 is used as an identifier of the apparatus in the network. The interface ID 803 is generated from the MAC address of the apparatus by use of a stateless address automatic setting function.

Next, description will be made below about each apparatus constituting the aforementioned communication system. Incidentally, the description of the PC 4 will be omitted because it is a general apparatus. In addition, description will be made with a server as the out-of-home apparatus 1 and an air conditioner as the in-home apparatus 3 by way of example.

Figure 3:
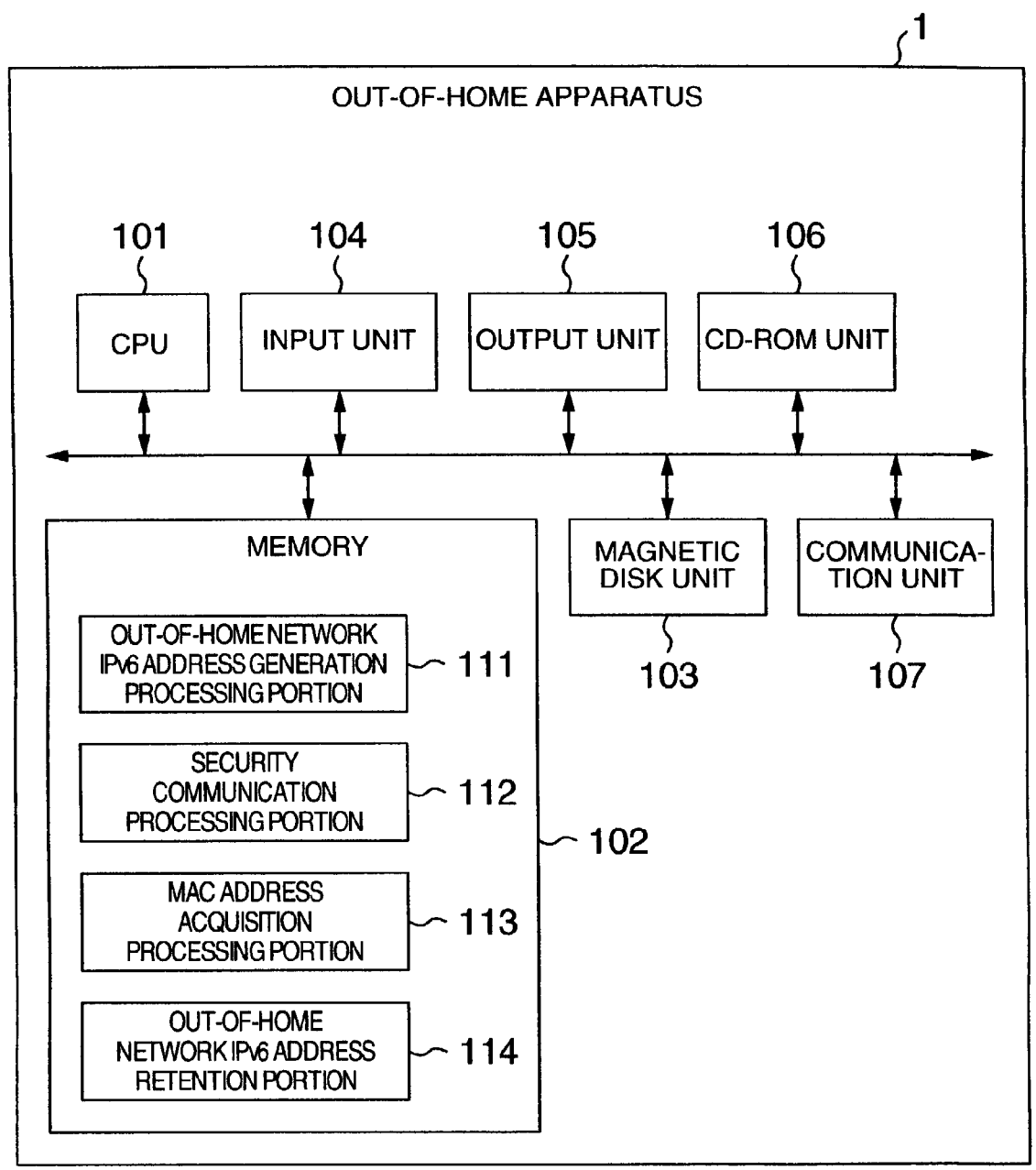
FIG. 3 is a diagram showing the schematic configuration of an out-of-home apparatus 1 according to the embodiment of the invention.

FIG. 3 is a diagram showing the schematic configuration of the out-of-home apparatus 1 according to this embodiment.

As shown in FIG. 3, the out-of-home apparatus 1 in this embodiment has a CPU 101, a memory 102, a magnetic disk unit 103, an input unit 104, an output unit 105, a CD-ROM unit 106 and a communication unit 107.

The CPU 101 is a unit for controlling the operation of the out-of-home apparatus 1 as a whole. The memory 102 is a storage unit for loading various processing programs or data for use in controlling the operation of the out-of-home apparatus 1 as a whole. The magnetic disk unit 103 is a storage unit for storing the various processing programs or data. The input unit 104 is a unit for performing various inputs for setting or controlling in connection with execution of the various programs. The output unit 105 is a unit for performing various outputs accompanying the execution of the various programs or the various inputs. The CD-ROM unit 106 is a unit for reading the contents of CD-ROMs in which the various processing programs have been recorded. The communication unit 107 is a unit for making communication with the firewall 2 through the out-of-home network 5.

In addition, the out-of-home apparatus 1 has an out-of-home network IPv6 address generation processing portion 111, a security communication processing portion 112, an MAC address acquisition processing portion 113 and an out-of-home network IPv6 address retention portion 114.

The out-of-home network IPv6 address generation processing portion 111 is a processing portion for generating a prefix 802 on the basis of the out-of-home network 5 to which the firewall 2 is connected, and generating an interface ID 803 from the MAC address of the in-home apparatus 3 which is a target for communication by use of a stateless address automatic setting function, so as to generate an out-of-home network IPv6 address from the prefix 802 and the interface ID 803.

The security communication processing portion 112 is a processing portion for making communication securely in terms of information security by use of cipher or authentication when the out-of-home apparatus 1 makes communication with the firewall 2 through the out-of-home network 5 by use of the communication unit.

The MAC address acquisition processing portion 113 is a processing portion for acquiring the MAC address of the in-home apparatus 3 which is a target for communication. The MAC address is acquired from a sales record, a user registration database, or the like, in an air conditioner maker. Address directory service or the like may be used. The MAC address may be acquired via a network by use of the communication unit or inputted manually by use of the input unit.

The out-of-home network IPv6 address retention portion 114 is a retention portion for retaining the out-of-home network IPv6 address for identifying the in-home apparatus 3, which is a target for communication, on the out-of-home network 5.

Assume that programs for making the out-of-home apparatus 1 function as the out-of-home network IPv6 address generation processing portion 111, the security communication processing portion 112, the MAC address acquisition processing portion 113 and the out-of-home network IPv6 address retention portion 114 are recorded in a recording medium such as a CD-ROM, stored in a magnetic disk or the like, then loaded on the memory and executed. Incidentally, the recording medium for recording the programs may be any recording medium other than the CD-ROM.

Figure 4:
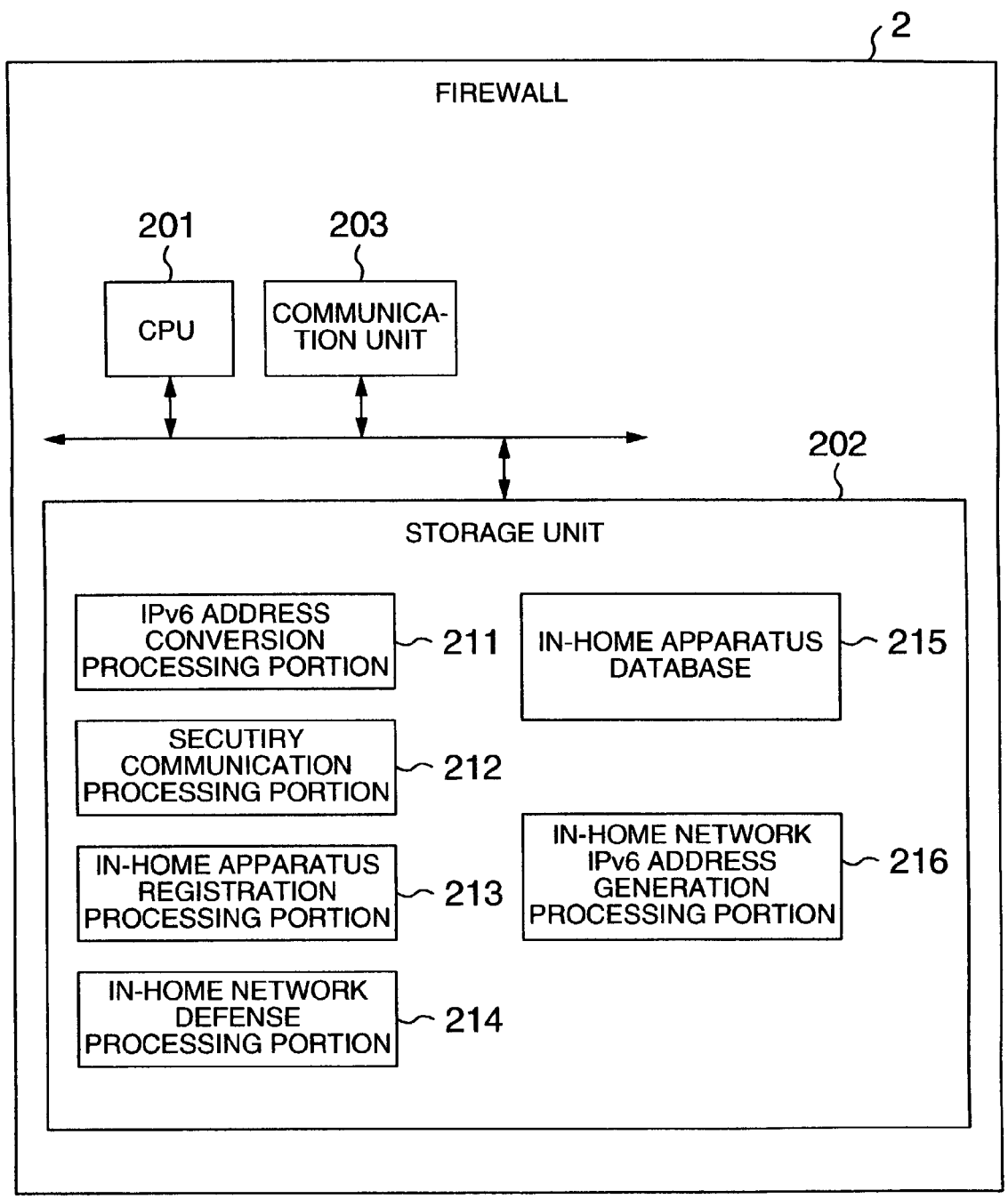
FIG. 4 is a diagram showing the schematic configuration of a firewall 2 according to the embodiment of the invention.

FIG. 4 is a diagram showing the schematic configuration of the firewall 2 according to this embodiment. As shown in FIG. 4, the firewall 2 in this embodiment has a CPU 201, a storage unit 202 and a communication unit 203.

The CPU 201 is a unit for controlling the operation of the firewall 2 as a whole. The storage unit 202 is a unit for storing various processing programs or data for controlling the operation of the firewall 2 as a whole. The communication unit 203 is a unit for making communication with the out-of-home apparatus 1 through the out-of-home network 5 and making communication with the in-home apparatus 3 through the in-home network 6.

In addition, the firewall 2 has an IPv6 address conversion processing portion 211, a security communication processing portion 212, an in-home apparatus registration processing portion 213, an in-home network defense processing portion 214, an in-home apparatus database 215 and an in-home network IPv6 address generation processing portion 216.

The IPv6 address conversion processing portion 211 is a processing portion by which the prefix portion of the destination IPv6 address of a message sent from the out-of-home apparatus 1 to the in-home apparatus 3 and received through the out-of-home network 5 by the communication unit 203 is converted into a prefix generated on the basis of the in-home network 6.

The security communication processing portion 212 is a processing portion for making communication securely in terms of information security by use of cipher or authentication when the firewall 2 makes communication with the out-of-home apparatus 1 through the out-of-home network 5 by use of the communication unit 203.

The in-home apparatus registration processing portion 213 is a processing portion by which it is confirmed whether the in-home apparatus 3 newly connected to the in-home network 6 is secure in terms of information security, and the in-home network IPv6 address of the in-home apparatus 3 concluded to be secure is registered in the in-home apparatus database 215. The in-home apparatus registration processing portion 213 also performs processing for registering the identification information of the out-of-home apparatus 1 having the authority to perform operation and maintenance for the in-home apparatus 3, such as reading data, operating by remote control, rewriting programs, and so on.

The in-home apparatus database 215 is a database for accumulating the in-home network IPv6 address of the in-home apparatus 3 and the identification information of the out-of-home apparatus 1 sent from the in-home apparatus registration processing portion 213. The in-home apparatus database 215 also accumulates information required for security communication such as key information, protocol information and the like when cipher or authentication is used in the communication on the in-home network 6.

The in-home network defense processing portion 214 is a processing portion for monitoring the communication between the out-of-home apparatus 1 and the in-home apparatus 3 as to processing having a damaging effect on the operation of the in-home apparatus, processing for leaking secret information, and the like, so as to prevent damage from occurring. By blocking communication onto the in-home network 6 from the out-of-home apparatus 1 which have not yet been concluded to be secure by the security communication processing portion 212, and by blocking communication onto the out-of-home network 5 from the in-home apparatus 3 which have not yet been registered in the in-home apparatus database 215, damage such as illegal operation, impersonation of an apparatus, peeping data through a channel, altering data, and so on, are prevented.

The in-home network IPv6 address generation processing portion 216 is a processing portion for generating a prefix 802 on the basis of the in-home network 6 to which the in-home apparatus 3 is connected, and generating an interface ID 803 from the MAC address of the in-home apparatus 3 by use of a stateless address automatic setting function, so as to generate an in-home network IPv6 address from the prefix 802 and the interface ID 803.

Figure 5:
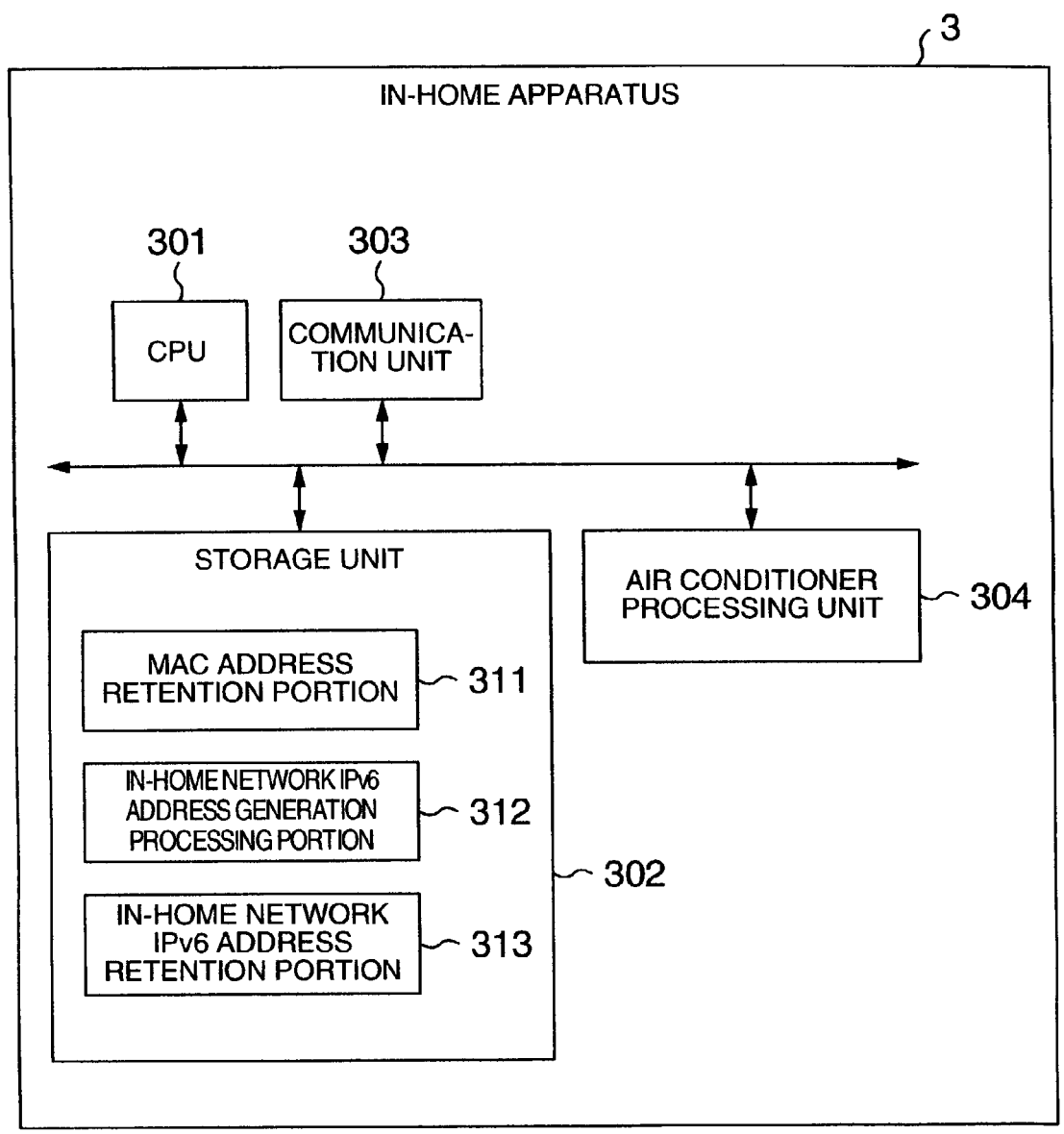
FIG. 5 is a diagram showing the schematic configuration of an in-home apparatus 3 according to the embodiment of the invention.

FIG. 5 is a diagram showing the schematic configuration of the in-home apparatus 3 according to this embodiment.

As shown in FIG. 5, the in-home apparatus 3 according to the embodiment has a CPU 301, a storage unit 302, a communication unit 303 and an air conditioner processing unit 304.

The CPU 301 is a unit for controlling the operation of the in-home apparatus 3 as a whole. The storage unit 302 is a unit for storing various processing programs or data for use in controlling the operation of the in-home apparatus 3 as a whole. The communication unit 303 is a unit for making communication with the firewall 2 through the in-home network 6. The air conditioner processing unit 304 is a processing unit having an air conditioner function which is a processing peculiar to the in-home apparatus 3. Incidentally, although description is made on the case where an air conditioner is used as the in-home apparatus 3 in this embodiment by way of example, the in-home apparatus 3 may be an apparatus other than the air conditioner. In this case, the air conditioner processing unit 304 is replaced by a processing unit having a function peculiar to the in-home apparatus 3.

In addition, the in-home apparatus 3 has an MAC address retention portion 311, an in-home network IPv6 address generation processing portion 312 and an in-home network IPv6 address retention portion 313.

The MAC address retention portion 311 is a retention portion for retaining an MAC address assigned peculiarly to the in-home apparatus 3.

The in-home network IPv6 address generation processing portion 312 is a processing portion for generating a prefix 802 on the basis of the in-home network 6 to which the in-home apparatus 3 is connected, and generating an interface ID 803 from the MAC address of the in-home apparatus 3 retained by the MAC address retention portion 311 by use of a stateless address automatic setting function, so as to generate an in-home network IPv6 address from the prefix 802 and the interface ID 803.

The in-home network IPv6 address retention portion 313 is a retention portion for retaining the in-home network IPv6 address for identifying the in-home apparatus 3 on the in-home network 6. When the in-home network IPv6 address retention portion 313 retains the in-home network IPv6 address, the in-home apparatus can make communication using the IPv6 protocol.

Next, description will be made on the operation of the aforementioned communication system.

First, description will be made on the preparatory operation carried out prior to normal communication, such as the operation of registration, the reservation of a security channel, and the like.

Figure 6:
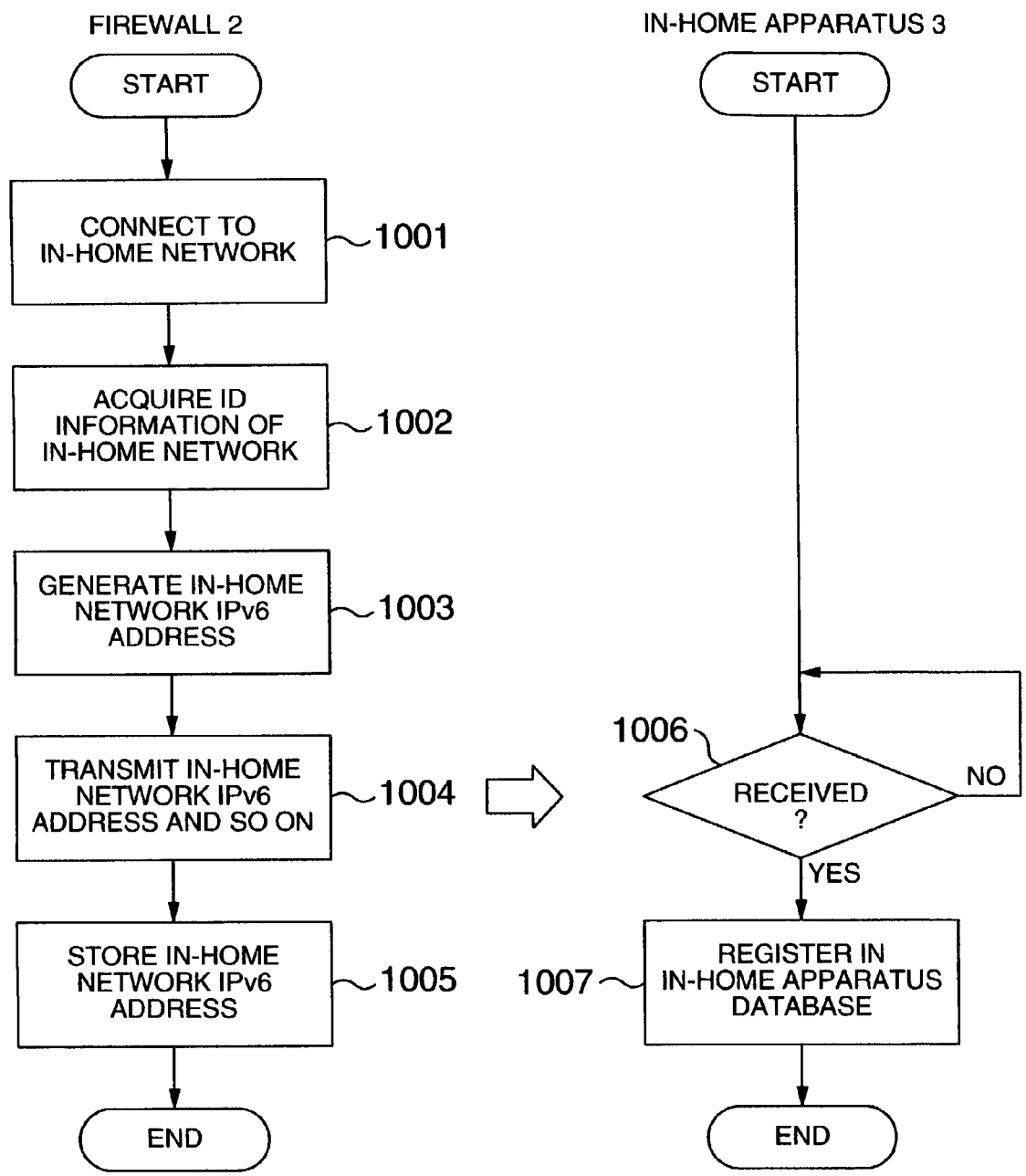
FIG. 6 is a flowchart for explaining the outline of the preparatory operation of the in-home apparatus 3 and the firewall 2 when the in-home apparatus 3 performs processing for generating an in-home network IPv6 address according to the embodiment of the invention.
Figure 7:
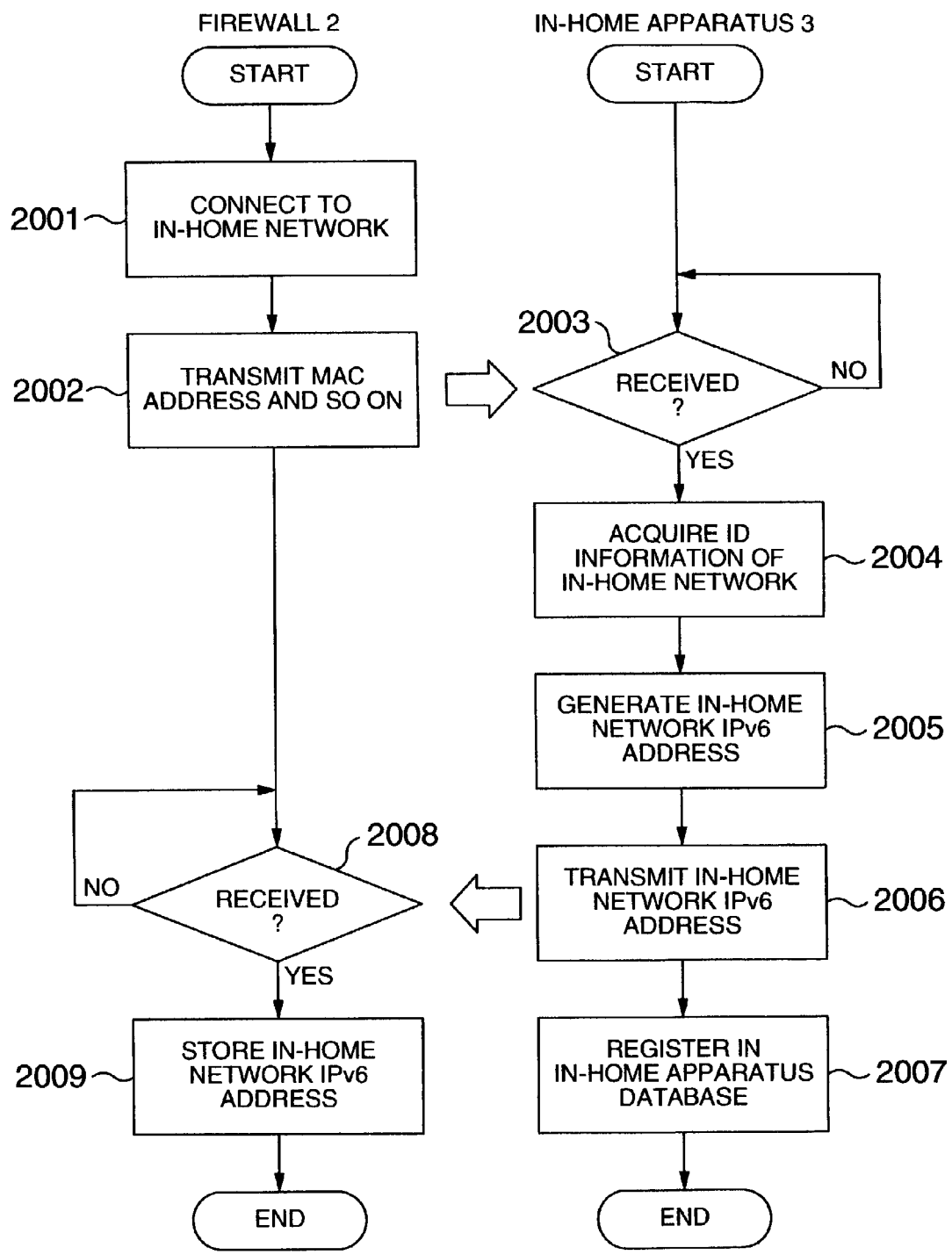
FIG. 7 is a flowchart for explaining the outline of the preparatory operation of the in-home apparatus 3 and the firewall 2 when the firewall 2 performs processing for generating an in-home network IPv6 address according to the embodiment of the invention.

FIGS. 6 and 7 are flowcharts for explaining the outline of the preparatory operation of the in-home apparatus 3 and the firewall 2. FIG. 6 shows the case where the processing for generating an in-home network IPv6 address is performed by the in-home apparatus 3, while FIG. 7 shows the case where the same processing is performed by the firewall 2. First, the case where the processing for generating an in-home network IPv6 address is performed by the in-home apparatus 3 will be described with reference to FIG. 6.

First, the in-home apparatus 3 is newly connected to the in-home network 6 (Step 1001). Next, the in-home network IPv6 address generation processing portion 312 of the in-home apparatus 3 acquires the identification information of the in-home network 6 from another apparatus on the in-home network 6 (Step 1002), and generates an in-home network IPv6 address from the MAC address of the in-home apparatus 3 itself retained by the MAC address retention portion 311, and the identification information of the in-home network 6 (Step 1003). Next, the communication unit 303 transmits the in-home network IPv6 address to the firewall 2 through the in-home network 6 (Step 1004). Here, the transmitted information may include not only the in-home network IPv6 address but also information required for security communication, such as the identification information of the out-of-home apparatus 1 having authority to perform operation and maintenance for the in-home apparatus 3, key information when cipher or authentication is used in the communication on the in-home network 6, and the like. Next, the generated in-home network IPv6 address is stored in the in-home network IPv6 address retention portion 313 (Step 1005).

Next, the information transmitted by the in-home apparatus 3 is received by the communication unit 203 of the firewall 2 through the in-home network 6 (Step 1006). Next, the information received by the communication unit 203 is registered in the in-home apparatus database 215 by the in-home apparatus registration processing portion 213 (Step 1007).

Next, the case where the processing for generating an in-home network IPv6 address is performed by the firewall 2 will be described with reference to FIG. 7.

First, the in-home apparatus 3 is newly connected to the in-home network 6 (Step 2001).

Next, the MAC address of the in-home apparatus 3 itself retained by the MAC address retention portion 311 is transmitted from the communication unit 303 to the firewall 2 through the in-home network 6 (Step 2002). Here, the transmitted information may include not only the MAC address but also information required for security communication, such as the identification information of the out-of-home apparatus 1 having authority to perform operation and maintenance for the in-home apparatus 3, key information when cipher or authentication is used in the communication on the in-home network 6, and the like.

Next, the information transmitted by the in-home apparatus 3 is received by the communication unit 203 of the firewall 2 through the in-home network 6 (Step 2003). Next, the in-home network IPv6 address generation processing portion 216 in the firewall 2 acquires the identification information of the in-home network 6 (Step 2004), and generates an in-home network IPv6 address from the MAC address of the in-home apparatus 3 received by the communication unit 203, and the identification information of the in-home network 6 (Step 2005). Next, the communication unit 203 transmits the generated in-home network IPv6 address to the in-home apparatus 3 through the in-home network 6 (Step 2006). Next, the generated in-home network IPv6 address and the information received by the communication unit 203 are registered in the in-home apparatus database 215 by the in-home apparatus registration processing portion 213 (Step 2007).

Next, the in-home network IPv6 address transmitted by the firewall 2 is received by the communication unit 303 of the in-home apparatus 3 through the in-home network 6 (Step 2008). Next, the received in-home network IPv6 address is stored in the in-home network IPv6 address retention portion 313 (Step 2009).

Figure 8:
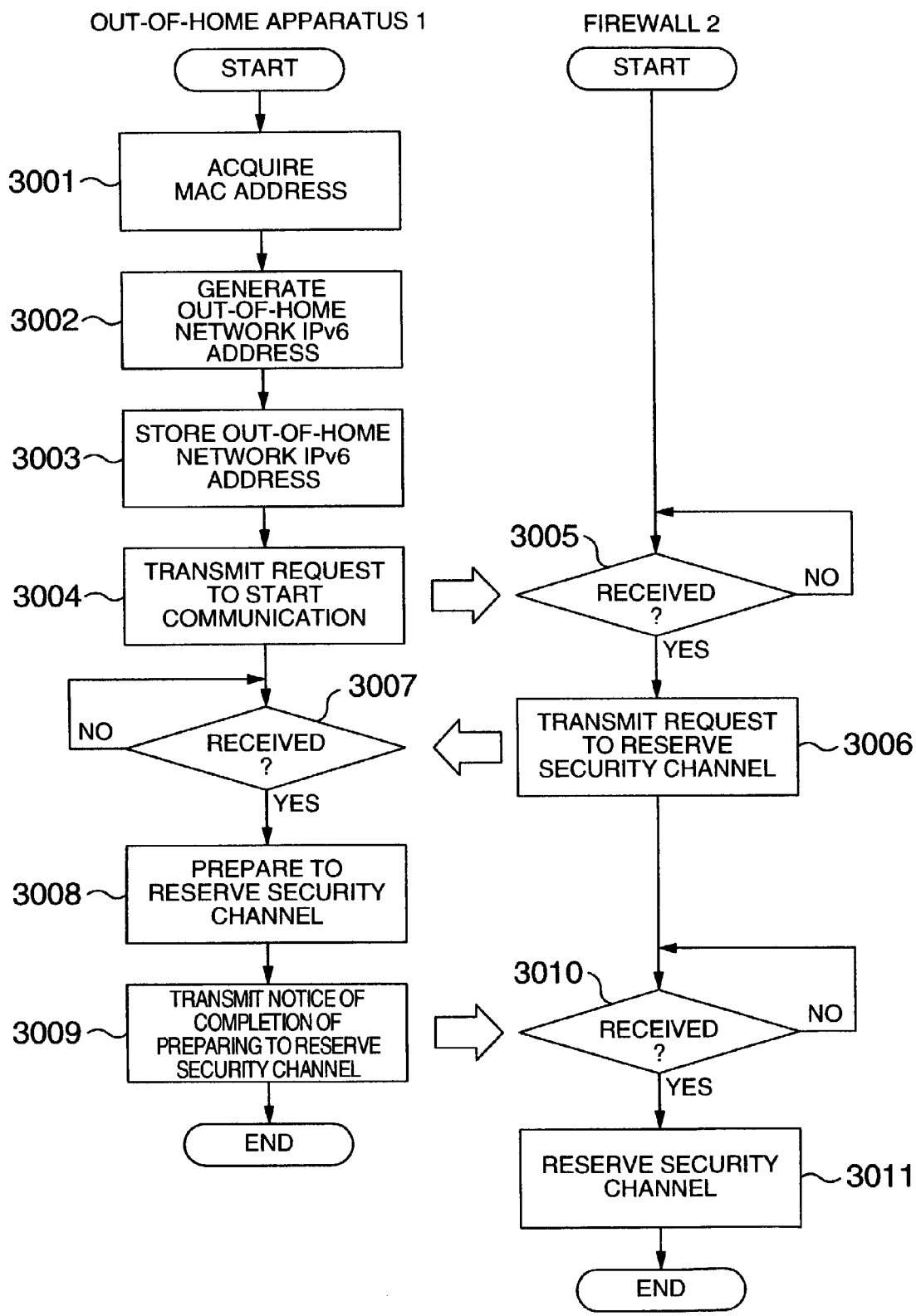
FIG. 8 is a flowchart for explaining the outline of the preparatory operation of the out-of-home apparatus 1 and the firewall 2 according to the embodiment of the invention.

FIG. 8 is a flowchart for explaining the outline of the preparatory operation of the out-of-home apparatus 1 and the firewall 2.

First, the MAC address acquisition processing portion 113 of the out-of-home apparatus 1 acquires the MAC address of the in-home apparatus 3 which is a target for communication (Step 3001). The MAC address may be acquired via the out-of-home network 5 by use of the communication unit 107, or may be inputted manually by use of the input unit 104. The MAC address may be acquired from a sales record, a user registration database or the like in an air conditioner maker, or by use of address directory service or the like through the out-of-home network 5. Next, the out-of-home network IPv6 address generation processing portion 111 acquires the identification information of the out-of-home network 5, and generates an out-of-home network IPv6 address from the MAC address of the in-home apparatus 3 acquired by the MAC address acquisition processing portion 113, and the identification information of the out-of-home network 5 (Step 3002). Here, the address directory service or the like may be used through the out-of-home network 5. Next, the generated out-of-home network IPv6 address is stored in the out-of-home network IPv6 address retention portion 114 (Step 3003). Next, the communication unit 107 of the out-of-home apparatus 1 transmits a request to start communication to the firewall 2 through the out-of-home network 5 (Step 3004).

Next, the communication unit 203 of the firewall 2 receives the request to start communication (Step 3005), and delivers the received request to the security communication processing portion 212. Next, the security communication processing portion 212 transmits a request to reserve a security channel to the out-of-home apparatus 1 through the communication unit 203 and the out-of-home network 5 (Step 3006). Here, the request to reserve a security channel includes information required for security communication, such as key information, a protocol and so on when cipher or authentication is used in the communication.

Next, the communication unit 107 of the out-of-home apparatus 1 receives the request to reserve a security channel (Step 3007), and delivers the received request to the security communication processing portion 112. Next, the security communication processing portion 112 performs preparation for reserving a security channel in accordance with the delivered request (Step 3008). Next, a notice of the completion of preparation for reserving a security channel is transmitted to the firewall 2 through the communication unit 107 and the out-of-home network 5 (Step 3009).

Next, the communication unit 203 of the firewall 2 receives the notice of the completion of preparation for reserving a security channel (Step 3010), and delivers the received notice to the security communication processing portion 212. Next, the security communication processing portion 212 reserves a security channel (Step 3011).

Subsequently, a security channel is reserved between the out-of-home apparatus 1 and the firewall 2 so that secure communication can be performed by use of cipher or authentication.

Next, the operation of normal communication performed between the out-of-home apparatus 1 and the in-home apparatus 3 will be described. Assume that the preparatory operation described in FIG. 6 or 7 and FIG. 8 is completed prior to this communication.

Figure 9:
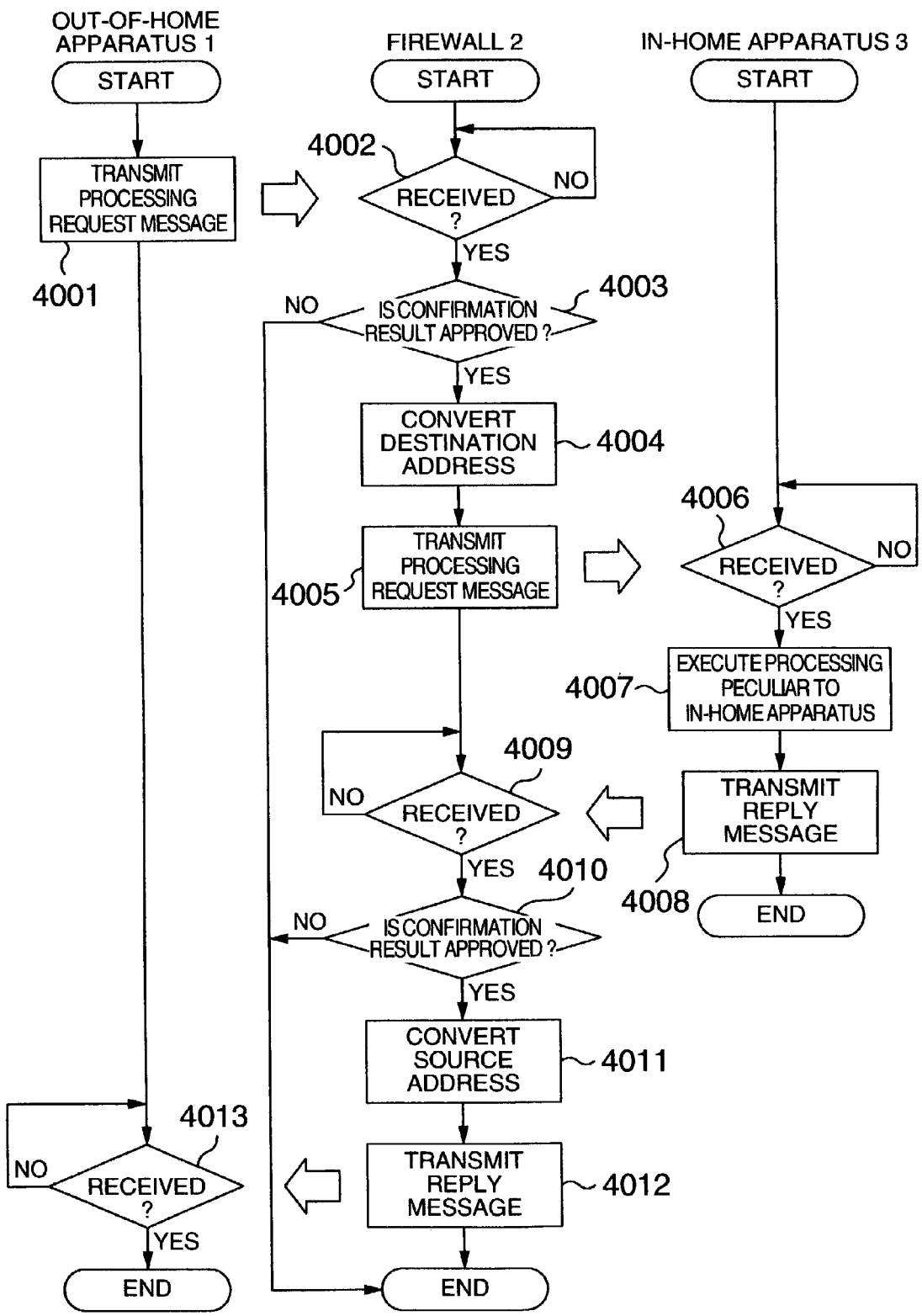
FIG. 9 is a flowchart for explaining the outline of the operation of normal communication carried out between the out-of-home apparatus 1 and the in-home apparatus 3 according to the embodiment of the invention.

FIG. 9 is a flowchart for explaining the outline of the operation of normal communication performed between the out-of-home apparatus 1 and the in-home apparatus 3.

First, the communication unit 107 of the out-of-home apparatus 1 transmits a processing request message to the firewall 2 through the out-of-home network 5 (Step 4001). The processing request message includes the IPv6 address of the out-of-home apparatus 1 as a source and the in-home network IPv6 address as a destination.

Next, the communication unit 203 of the firewall 2 receives the processing request message from the out-of-home apparatus 1 (Step 4002), and delivers the received message to the in-home network defense processing portion 214 in the firewall 2. Next, the in-home network defense processing portion 214 confirms whether the processing contents included in the message is secure or not, and also confirms, with reference to the in-home apparatus database 215, whether the out-of-home apparatus 1 which is a source has authority to perform the processing upon the in-home apparatus 3 which is a destination (Step 4003). If there is a problem as the result of the confirmation ("No" in Step 4003), the firewall 2 terminates the processing. If there is no problem as the result of the confirmation ("Yes" in Step 4003), the IPv6 address conversion processing portion 211 in the firewall 2 converts the destination from the out-of-home network IPv6 address to the in-home network IPv6 address (Step 4004). Next, the communication unit 203 of the firewall 2 transmits a processing request message to the in-home apparatus 3 through the in-home network 6 (Step 4005). The processing request message includes the IPv6 address of the out-of-home apparatus 1 as a source and the in-home network IPv6 address as a destination.

Next, the communication unit 303 of the in-home apparatus 3 receives the message from the firewall 2 (Step 4006). Next, the air conditioner processing unit 304 performs processing peculiar to the in-home apparatus 3, such as start of heating operation (Step 4007).

Next, the communication unit 303 of the in-home apparatus 3 transmits a reply message to the firewall 2 through the in-home network 6 (Step 4008). The reply message is for replying to the aforementioned processing request message, and includes the in-home network IPv6 address as a source and the IPv6 address of the out-of-home apparatus 1 as a destination.

Next, the communication unit 203 of the firewall 2 receives the reply message from the in-home apparatus 3 (Step 4009), and delivers the received message to the in-home network defense processing portion 214. Next, the in-home network defense processing portion 214 confirms whether information contained in the message is secure or not, and also confirms, with reference to the in-home apparatus database 215, whether the out-of-home apparatus 1 which is a destination has authority to obtain information of the in-home apparatus 3 which is a source (Step 4010). If there is a problem as the result of the confirmation ("No" in Step 4010), the firewall 2 terminates the processing. If there is no problem as the result of the confirmation ("Yes" in Step 4010), the IPv6 address conversion processing portion 211 of the firewall 2 converts the source from the in-home network IPv6 address to the out-of-home network IPv6 address (Step 4011). Next, the communication unit 203 of the firewall 2 transmits a reply message to the out-of-home apparatus 1 through the out-of-home network 5 (Step 4012). The reply message includes the out-of-home network IPv6 address as a source and the IPv6 address of the out-of-home apparatus 1 as a destination.

Next, the communication unit 107 of the out-of-home apparatus 1 receives the reply message from the firewall 2 (Step 4013).

Next, description will be made on the in-home apparatus database 215 according to this embodiment.

FIG. 10 is a diagram showing an example of the in-home apparatus database 215 according to this embodiment.

In-home network IPv6 addresses 901 of the in-home apparatuses 3 connected to the in-home network 6; identification information 902 of each of the out-of-home apparatuses 1 having authority to perform operation and maintenance for the corresponding in-home apparatus 3, such as reading data, operating by remote control, rewriting programs, and the like; and information 903 required for security communication, such as key information, protocol information and the like when cipher or authentication is used in the communication on the in-home network 6 are stored in the in-home apparatus database 215.

Next, description will be made on the case where the PC 4 is used at home with reference to FIG. 1.

The PC 4 is connected to a PC in-home network 7 different from the in-home network 6. The PC 4 generates a prefix 802 on the basis of the PC in-home network 7, and generates an interface ID 803 from the MAC address of the PC 4 by use of a stateless address automatic setting function, so as to generate an IPv6 address of the PC 4 from the prefix 802 and the interface ID 803.

Communication between the PC 4 and the in-home apparatus 3 is always carried out through the firewall 2 because they are connected to the different networks respectively. For the in-home apparatus 3, the PC 4 is handled in the same manner as the out-of-home apparatus 1. Incidentally, although description has been made on the PC by way of example, the same thing will be applied to any apparatus if it is in danger of infection with a virus in the same manner as the PC.

Description has been made above on the embodiment of the invention.

According to this embodiment, of the in-home network 6, only the firewall 2 is connected to the outside, and the firewall 2 identifies the in-home apparatus 3 on the in-home network 6. On the other hand, for communication on the out-of-home network 5, a security channel is reserved between the out-of-home apparatus 1 and the firewall 2. From the above description, the out-of-home apparatus 1 and the in-home apparatus 3 can make secure communication with each other. In addition, from the above description, it is not necessary to mount a security communication function on the in-home apparatus 3.

In addition, according to this embodiment, communication using IPv6 is performed, and conversion is given to the prefix 802 of the IPv6 address in the firewall 2. Accordingly, the out-of-home apparatus 1 can start communication with a specified in-home apparatus 3 which is a target for communication.

In addition, according to this embodiment, the PC 4 is connected to the PC in-home network 7 different from the in-home network 6, and communication between the PC 4 and the in-home apparatus 3 is always carried out via the firewall 2. Accordingly, communication between the PC 4 and the in-home apparatus 3 and communication between the out-of-home apparatus 1 and the in-home apparatus 3 is always made via the firewall 2. Thus, illegal processing is monitored so that damage can be prevented from occurring.

In addition, according to this embodiment, even when the network changes due to the change of the Internet service provider or the like, only the out-of-home network 5 changes, but the in-home network 6 and the PC in-home network 7 remain unchanged. Thus, communication via the out-of-home network 5 may be made by a simple method of changing the setting of the address of the firewall 2, and without any necessity to change the setting of the addresses of the in-home apparatus 3 and the PC 4.

Incidentally, although description has been made on the case where the out-of-home network 5 and the PC in-home network 7 are separated from each other, they may be the same one.

In addition, although the network to which an apparatus is connected is identified by converting the prefix 802 of the IPv6 address in the firewall, the prefix 802 may be fixed. In this case, the network to which an apparatus is connected can be identified by investigating the history of the path of a communication message so that effect equivalent to that in this embodiment can be obtained.

In addition, the out-of-home apparatus 1 does not have to be a server. The out-of-home apparatus 1 may be any information apparatus if the information apparatus can perform communication using the IPv6 protocol and includes the out-of-home network IPv6 address generation processing portion 111, the security communication processing portion 112, the MAC address acquisition processing portion 113 and the out-of-home network IPv6 address retention portion 114.

In addition, the out-of-home network IPv6 address generation processing portion 111, the security communication processing portion 112, the MAC address acquisition processing portion 113 and the out-of-home network IPv6 address retention portion 114 do not have to belong to one piece of hardware. Those processing portions may belong to different pieces of hardware so as to carry out processing organically by communication. In addition, the in-home apparatus 3 does not have to be an air conditioner. The in-home apparatus 3 may be any information apparatus if it has the MAC address retention portion 311 and can make communication using the IPv6 protocol.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An in-home network system including a firewall and an information apparatus,
    wherein the firewall comprises:
    first communication means connected to a first network for transmitting and receiving data through the first network by use of an IPv6 protocol;
    means for acquiring a first network identifier of the first network, wherein the first network identifier of the first network is included in an IPv6 address, the IPv6 address having 128 bits and the first network identifier being included as a first 64 bit prefix in the IPv6 address;
    second communication means connected to a second network for transmitting and receiving data through the second network by use of the IPv6 protocol;
    means for acquiring a second network identifier of the second network, wherein the second network identifier of the second network is included in an IPv6 address, the IPv6 address having 128 bits and the second network identifier being included as a second 64 bit prefix in the IPv6 address;
    IPv6 address converting means by which a portion of a destination IPv6 address of a first message received from an apparatus connected to the first network and corresponding to the first network identifier is converted to the second network identifier, and by which a portion of a source IPv6 address of a second message received from an information apparatus connected to the second network and corresponding to the second network identifier is converted to the first network identifier, whereby communication can occur between the apparatus connected to the first network and the information apparatus connected to the second network; and
    an IPv6 address generation processing module configured to generate a first registration IPv6 address based on the second network identifier and an apparatus identifier of the information apparatus, wherein the first registration IPv6 address is registered by the firewall; and
    wherein the information apparatus includes:
    communication means for transmitting and receiving data to and from the firewall by use of the IPv6 protocol;
    means for acquiring the second network identifier of the second network;
    means for generating a second registration IPv6 address based on the second network identifier and the apparatus identifier of the information apparatus, wherein the second registration IPv6 address is registered by the firewall;
    communication means for transmitting the second registration IPv6 address thus generated to the firewall;
    communication means for transmitting and receiving data to and from the apparatus connected to the first network through the firewall by use of the IPv6 protocol;
    means for extracting the portion corresponding to the first network identifier of the source IPv6 address of the first message received from the firewall, the message originating from the apparatus connected to the first network; and
    means for deciding that the first message received is acceptable if the extracted network identifier matches the second network identifier of an IPv6 address of the information apparatus, wherein the extracted network identifier corresponds to the first 64 bit prefix of the IPv6 address of the apparatus connected to the first network and the second network identifier corresponds to the second 64 bit prefix of the IPv6 address of the information apparatus.

2. A communication method for an in-home network system comprising:
    transmitting, from a first apparatus connected to a first network, a first processing request message to a firewall through the first network, the first processing request message including a first IPv6 address of the first apparatus as a source and a second IPv6 address as a destination;
    converting, by the firewall, a portion of the first IPv6 address to a portion of the second IPv6 address, whereby communication can occur between the first apparatus connected to the first network and a second apparatus connected to a second network;
    generating, by the firewall, a first registration IPv6 address based at least in part on a first network identifier of the second network and an apparatus identifier of the second apparatus, wherein the first network identifier of the second network is included in the first registration IPv6 address, the first registration IPv6 address having 128 bits and the first network identifier being included as a first 64 bit prefix in the first registration IPv6 address;
    generating, by the second apparatus, a second registration IPv6 address based at least in part on the first network identifier of the second network and the apparatus identifier of the second apparatus, wherein the first network identifier of the second network is included in the second registration IPv6 address, the second registration IPv6 address having 128 bits and the first network identifier being included as a second 64 bit prefix in the second registration IPv6 address;

storing at least the first and second registration IPv6 addresses in a database module;

confirming, by the firewall, whether processing content contained in the first processing request message is secure;

determining, by the firewall referencing the database module and comparing registration IPv6 addresses including the first and second registration IPv6 addresses, whether the first apparatus has authority to perform processing on the second apparatus;

transmitting, by the firewall, a second processing request message to the second apparatus through the second network, the second processing request message including the first IPv6 address of the first apparatus as a source and the second IPv6 address as a destination;

extracting, by the second apparatus, from the second processing request message received from the firewall, a portion corresponding to the first network identifier of the first IPv6 address as a source of the processing request message, and determining if the processing request message received is acceptable if the extracted network identifier matches the second network identifier of an IPv6 address of the second apparatus, wherein the extracted network identifier corresponds to the first 64 bit prefix of the IPv6 address of the first apparatus and the second network identifier corresponds to the second 64 bit prefix of the IPv6 address of the second apparatus;

performing, by the second apparatus, an operation corresponding to the second apparatus;

transmitting, by the second apparatus, a reply message to the firewall through the second network in response to the second processing request message, the reply message including the second IPv6 address as a source and the first IPv6 address of the first apparatus as a destination;

confirming, by the firewall, whether information contained in the reply message is secure;

converting, by the firewall, the source of the reply message from the second IPv6 address to the first IPv6 address whereby as a result, communication can occur between the second apparatus connected to the second network and the first apparatus connected to the first network; and transmitting, by the firewall, the reply message thus converted to the first apparatus through the first network, the converted reply message including the second IPv6 address as a source and the first IPv6 address of the first apparatus as a destination.

3. A communication method as in claim 2 wherein:

communication between the first apparatus and the firewall is secured using one of a cipher communication function and an authentication function; and communication between the second apparatus and the firewall is not secured.

4. An in-home network system as claimed in claim 1, further comprising:

a database module configured to store and register a plurality of registration IPv6 addresses including the first registration address and the second registration IPv6 address.

5. An in-home network system as claimed in claim 4, further comprising:

a network defense processing module configured to confirm whether the message sent from the apparatus connected to the first network is secure and to determine, by referencing the database module and comparing registration IPv6 addresses including the first and second registration IPv6 addresses, whether the apparatus connected to the first network has authority to perform processing on the information apparatus connected to the second network.

* * * * *